United States Patent Office 2,980,193
Patented Apr. 18, 1961

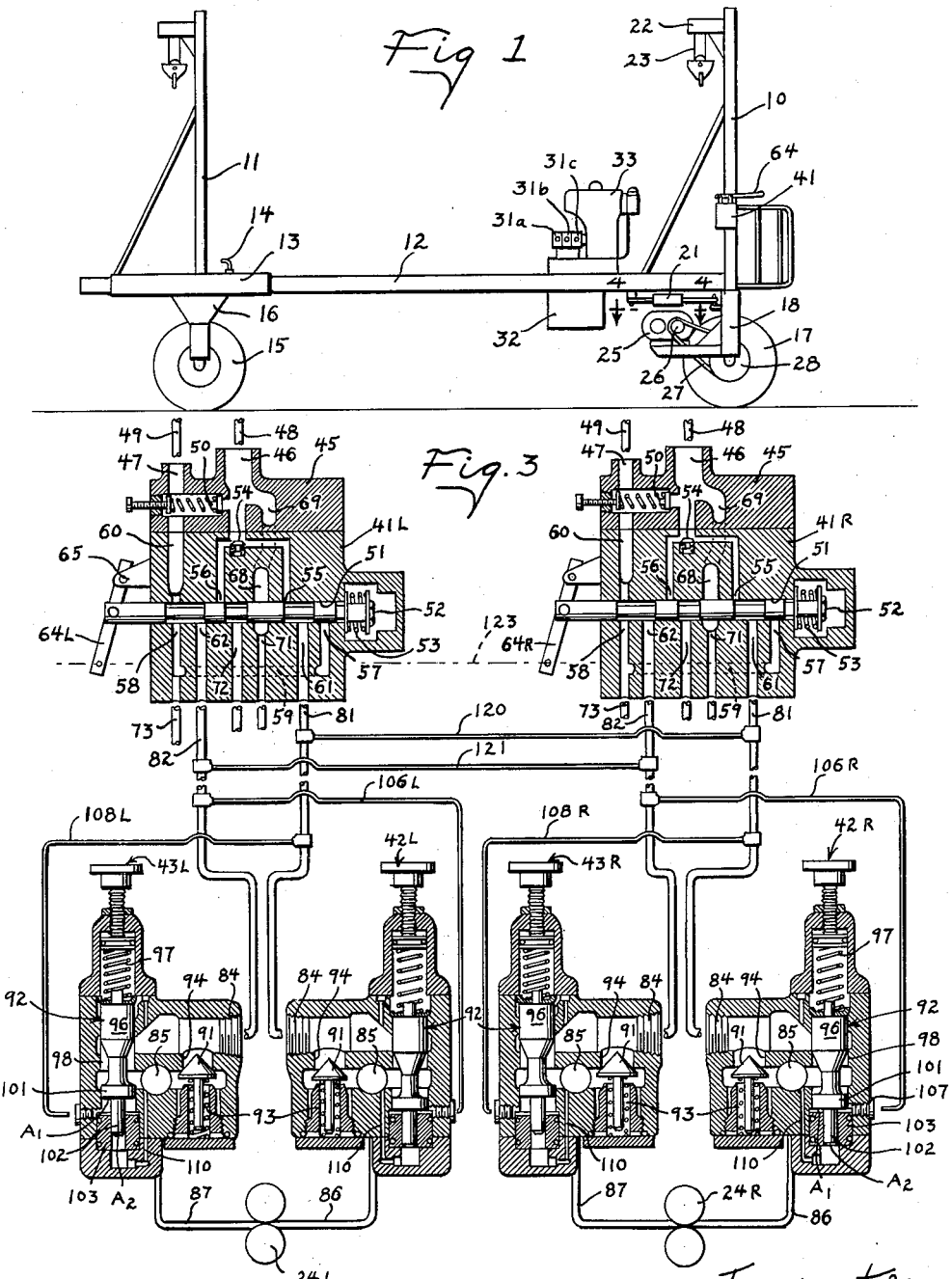

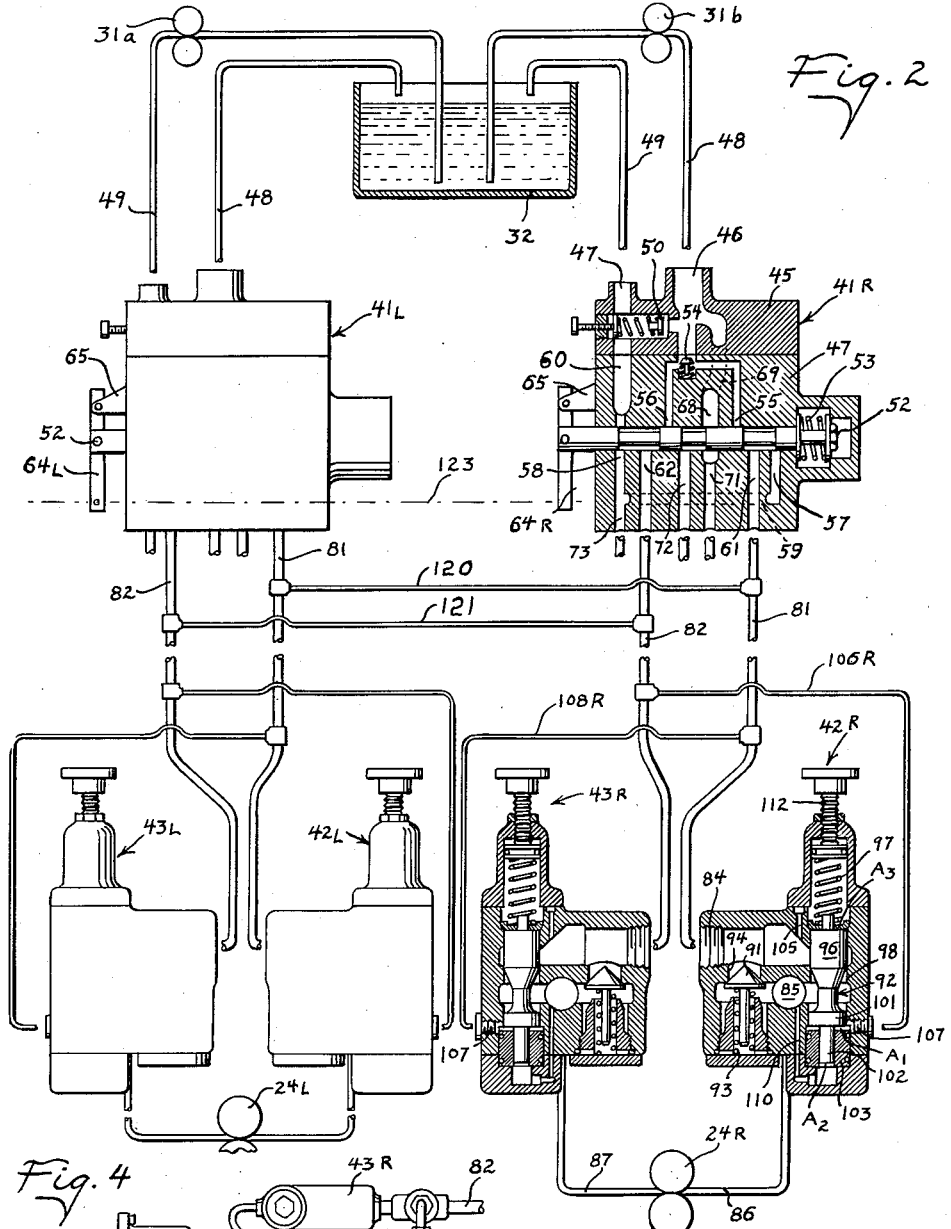
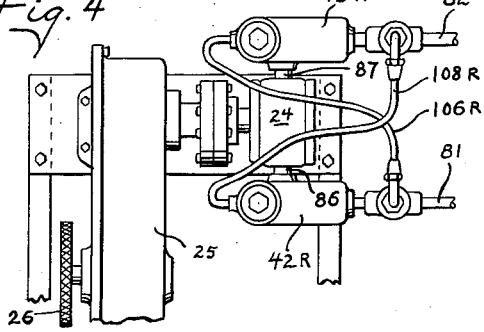

2,980,193
FLUID DRIVING SYSTEM FOR VEHICLES

George J. Baudhuin and Arnold C. Petersen, Sturgeon Bay, Wis., assignors to Marine Travelift & Engineering, Inc., Sturgeon Bay, Wis., a corporation of Wisconsin Filed Nov. 16, 1959, Ser. No. 853,262

15 Claims. (Cl. 180—6.48)

This invention relates to an hydraulic drive system for a self-propelled vehicle.

An important object of this invention is to provide an hydraulic drive system for a vehicle having a plurality of drive wheels, which drive system is arranged to provide a differential action to enable the drive wheels to rotate at relatively different speeds during turning of the vehicle and which will prevent the loss of pressure to one of the wheels in the event the other wheel loses traction or begins to spin.

Another object of this invention is to provide an hydraulic vehicle drive system of the type having a fluid drive motor connected to the wheel, a remote pump for supplying fluid to the motor, and a control valve for reversibly controlling the flow of fluid from the pump to the motor, which drive system has brake valves located adjacent the drive motors and operated under the control of the remote control valve for regulating the flow of fluid to and from the drive motor to retard rotation of the motor when the control valve is shut off.

Yet another object of this invention is to provide an hydraulic drive system in accordance with the foregoing object and which is operative to effect braking of the hydraulic drive motor in either direction of rotation of the motor.

These, togther with various ancillary objects and advantages of this invention will be more readily appreciated as the same becomes better understood by reference to the following detailed description when taken in connection with accompanying drawing wherein:

Figure 1 is a side elevational view of the self-propelled vehicle having the drive system of the present invention applied thereto;

Fig. 2 is a schematic view illustrating the drive system with the control valve in the neutral position;

Fig. 3 is a schematic view of the drive system with the control valves moved out of the neutral position thereof to effect driving of the motor in one direction; and Fig. 4 is a fragmentary sectional view taken on the plane 4—4 of Fig. 1.

The vehicle drive system of the present invention is herein shown applied to a self-propelled vehicle of the type generally shown in Patent No. 2,909,298 to George J. Baudhuin, to which reference is made for a more detailed description of the vehicle. In general, the vehicle includes a front generally U-shaped frame 10, a rear U-shaped frame 11 and spaced side members 12. The front frame is secured to the forward ends of the side members 12, and the rear frame 11 is attached to a sleeve 13 which is slidable along the side members and is adapted to be locked in adjusted position by a screw 14. The rear vehicle support wheels 15 are mounted by a yoke 16 on the sleeves 13 and the front wheels are journaled in yokes 18. The front yokes 18 are mounted for turning movement about an upright axis preferably aligned with the front frame 10, and turning of the front forks is effected by steering control units 21. Winches 22 are provided on each of the front and rear frames and operate a tackle 23 to elevate and lower the objects to be transported by the vehicle.

Hydraulic drive motors 24, conveniently of the intermeshing gear type, are mounted on each of the steering forks 18 for turning movement therewith and are connected through a gear reducer 25, sprocket 26, chain 27 and sprocket 28 to a respective one of the front steering and drive wheels 17 to rotate the latter in accordance with the direction of rotation of the hydraulic motor. Fluid under pressure is supplied to the hydraulic drive motors 24, the steering cylinders 21, and the winch drive motors 22 from one or more fluid pumps herein shown three in number and designated 31a–31c. The pumps have their inlets connected to a reservoir 32 and are driven by an engine 33 also mounted on the vehicle.

The hydraulic drive system for each drive wheel includes a four-way flow reversing valve 41 and a pair of brake valves 42 and 43. The valves for each cylinder are similar and like numerals are used to designate corresponding parts of the drive system for the several wheels. In the embodiment herein illustrated, a pair of drive wheels are provided, one at each side of the self-propelled vehicle, and, for convenience, the control and brake valves of the hydraulic system associated with the right hand wheel are designated by the letter R and the control and brake valves of the drive system associated with the left hand wheel are designated by the letter L. Although the vehicle shown has two drive wheels, it is to be understood that the drive system is adapted, by duplication of the controls, to drive all four wheels of the vehicle.

The control valves 41 are conventional four-way three positioned valves of the type in which the work ports are in open communication with each other and with the reservoir return line when the valve is in its neutral position. As diagrammatically shown in Fig. 2, the valves 41 have an inlet section 45 formed with a pressure inlet port 46 and a low pressure return port 47. The inlet port 46 is connected as through a pipe 48 with the discharge side of one of the pumps 31, and the return port is connected through a line 49 with the reservoir 32. A relief valve 50 is mounted in the inlet section between the inlet and return ports 46 and 47 and is arranged to open to by-pass the pump discharge, when the pressure at the inlet exceeds a preselected value. The working section 47 of the valve has a valve bore 51 therein and a spool valve member 52 slidable in the bore. The spool valve member is normally returned to its neutral position shown in Fig. 2 by a return spring 53. Fluid under pressure from the pressure inlet 46 is supplied past a check valve 54 to spaced pressure ports 55 and 56. Return ports 57 and 58 are communicated with each other through a passage 59, and are connected through a passage 60 with the return port 47 of the inlet section. The valve has controlled or work ports 61 and 62 and, in the neutral position of the valve, the valve spools block the pressure inlet ports 55 and 56 and communicate the work ports 61 and 62 with each other and with the return passage 60. As is conventional, an operating lever designated 64 is pivotally attached to an ear 65 on the valve casing and to the spool member 52 for selectively moving the same. When the spool valve member is moved in either direction from its neutral position, fluid under pressure is supplied to one of the work ports and the other work port is connected to the return line. Thus, when the spool valve member is moved to the left from its neutral position shown in Fig. 2 to the position shown in Fig. 3, fluid under pressure from the pressure port 55 is supplied to the work port 61 and the work port 62 is communicated to the return line 49. Conversely, when the spool valve member is moved to the right from its neutral position shown in Fig. 2, fluid under pressure will be supplied to the other work port 62. The work section 47 of the particular valve herein illustrated is arranged to be connected in multiple with other valve work sections and, for this purpose, has an auxiliary pressure port 68 which is in continuous communication through passage 69 with the pressure inlet 46. Fluid under pressure from the auxiliary pressure port 68 is continuously supplied to an auxiliary pressure outlet 71 and is intermittently supplied to a second auxiliary outlet 72 only when the valve stem is in its neutral position. An auxiliary return line 73 communicates with the return passage 60. Thus, a control valve (not shown) for other equipment such as the winch 22 may be connected to the valve 41.

The work ports 61 and 62 of the control valves are connected through conduits 81 and 82 to the respective hydraulic motor 24. The length of the conduits 81 and 82 will vary dependent upon the relative distances and are generally formed in whole or in part at least of a resilient tubing such as rubber in order to accommodate relative movement between the parts of the vehicle. The brake valves 42 and 43 are connected in the conduit 81 and 82 respectively and are advantageously mounted closely adjacent the hydraulic motors 24 and conveniently directly thereon as best shown in Fig. 4. The brake valves 42 and 43 are identical in construction and like numerals are used to designate corresponding parts. Although the brake valves are herein shown as separate units, it is apparent that the valves could, if desired, be formed in a single body. The brake valves are arranged to be operated under the control of the control valves 41 so as to close and block flow from the respective hydraulic motor, when the control valve is in its neutral position, and to automatically open and permit free flow of fluid to and from the motor when the control valve is moved out of its neutral position. The brake valves each include a first port 84 which is connected to a respective one of the conduits 81 and 82 leading to the control valve 41 and a second port 85 which is connected through a respective one of passages 86 and 87 to the hydraulic drive motor. Flow between the ports 84 and 85 is under the control of a check valve 91 and a pilot operated valve 92 which are connected in parallel with each other. The check valve 91 is biased by a spring 93 to a position blocking flow through the check valve port 94 and is arranged to move to its open position and permit flow from the port 84 to the port 85, and to close to prevent return flow. The bypass valve 92 includes a spool 96 which is yieldably urged by a spring 97 to a position blocking flow through the by-pass port 98. Provision is made for opening the by-pass valve 92 in one of the conduits such as 81, to permit return flow from the fluid motor 24, when fluid under pressure is supplied to the motor through the other conduit 82. For this purpose, first and second pistons 101 and 102 are provided on the valve member 92 at the end opposite the spring 97. A plug 103 slidably receives the piston 102 and segregates the area A–1 of the piston 101 from the area A–2 of the piston 102. Fluid under pressure from one conduit such as 82 is supplied through a tube 106 and pressure inlet port 107 to the area A–1 of the valve member of brake valve 42 and, similarly, fluid under pressure from the other conduit 81 is supplied through a conduit 108 and the aforedescribed pressure port 107 to the area A–1 of the valve member of brake valve 43. Thus, when the control valve 41 is moved to a position such as shown in Fig. 3 to supply fluid under pressure to one of the conduits such as 81, the check valve 91 in the associated brake valve 42 will open and permit flow to the motor and, simultaneously, fluid under pressure will be supplied from the conduit 81 through tube 108 to open the bypass valve in the conduit 82 which then functions as the return line for the motor 24. When the control valve 41 is returned to its neutral position, the conduits 81 and 82 are communicated with the reservoir 32 and under these conditions, the pressure on the area A–1 is insufficient to open the by-pass valve in either of the brake valves 42 or 43. This cuts off the flow of fluid from the hydraulic motor 24 and retards or stops rotation of the hydraulic motor and its associated wheel 17.

In accordance with the present invention, provision is made for gradually retarding rotation of the pump when the control valve is moved to its neutral position, to prevent the build-up of excessive pressures and stresses in the drive system. For this purpose, fluid under pressure from the second or motor outlet port 85 of each brake valve is supplied through a passage 110 to the area A–2 on the piston 102. The area A–2 is selected so as to be relatively small as compared to the area A–1 so that the by-pass valve 92 is moved to its open position in response to pumping action of the associated hydraulic motor 24, only when the pressure reaches a relatively high value substantially in excess of the normal operating pressure supplied by the pump 31. The pressure applied by the spring 97 is made adjustable by a screw 112 so as to enable adjustment of the pressure in the lines 86 or 87 required to effect opening of the by-pass valve in response to pumping of the hydraulic motors 24, and hence control the amount of "braking action" applied to the motors.

In accordance with the present invention, the drive system is also arranged to enable the drive wheels to rotate at relatively different speeds as is necessary due to the markedly different turning radius of the wheels when the vehicle is turning. The wheel at the inside during a turn will rotate slower and, since the pumps 31 are operated at the same speed, the pressure on the drive motor 24 for the inside wheel will build up substantially above the pressure on the drive motor for the outside wheel. This tends to cause a slow spinning of the inside wheel during the turn. In order to overcome this problem, a restricted by-pass tube 120 is connected to the work conduits 81 of the control valves 41R and 41L and a second restricted by-pass tube 121 is connected to the work conduits 82. The tubes 121 and 122 provide restricted communication between the conduits 81 and between the conduits 82. Since the control valves are operated in unison, as by a linkage 123 to simultaneously supply fluid under pressure to either the conduits 81 or 82 for both the left and right drive motors, an increase in pressure in one of the conduits such as 81 for one drive motor such as 24L will be partially relieved by flow through the restricted tube 120 to the conduit 81 for the other drive motor 24R. This not only reduces the pressure on the wheel drive motor at the inside during the turn, but also supplies additional fluid under pressure to the motor for the outboard wheel so as to drive the latter relatively faster.

The differential in the rate of turning of the wheels is relatively low. In order to prevent complete loss of pressure and hard stalling of the vehicle when only one wheel looses traction, the tubes 120 and 121 are selected so as to be small as compared to the conduits 81 and 82 and to provide a relatively high impedance to the flow of full pump discharge through the tubes. Thus, a small tube, for example a one-quarter inch tube, will be sufficient to relieve the pressure which builds up on one motor during a turn. However, if one motor completely looses traction and begins to spin, the tube will restrict flow therethrough from the other line and thus maintain sufficient pressure on the other motor to effect driving of the vehicle. The by-pass tubes 120 and 121 can be advantageously located closely adjacent the control valves 41L and 41R. Since the control valves are mounted in side-by-side relation, this minimizes the length of the by-pass tubes.

From the foregoing it is thought that the construction and operation of the driving system will be readily understood. When the control valves 41 are in their neutral position, the conduits 81 and 82 are communicated to the reservoir so that the pressure on the areas A-1 of the by-pass valves are at a low value. The by-pass valves will therefore remain closed and prevent flow in either direction from the respective hydraulic motor until the pressure in one of the conduits 86 or 87 reaches the preselected value which, acting on the area A-2, is sufficient to overcome the spring pressure of spring 97. The brake valves therefore maintain a relatively high back pressure on the hydraulic motors when the control valve is in its neutral position, to retard rotation of the motors and gradually stop the vehicle when it is in motion, and to hold the vehicle in its stopped position on an incline. However, when the control valve is moved in either direction from its neutral position, such as to the left as viewed in Fig. 3, fluid under pressure is supplied to one of the conduits 81. The fluid opens the check valve 91 in the associated brake valve 42 and passes to the hydraulic motor 24 to drive the same in one direction. The fluid under pressure from the conduit 81 is also supplied to the tube 108 and area A-1 on the by-pass valve of brake valve 43 so as to open the return line and permit fluid from the hydraulic motor to flow through conduit 82 back to the reservoir. Conversely, when the control valve is moved in the other direction from its neutral position, it supplies fluid under pressure to the conduit 82 and communicates the conduit 81 to the reservoir 32 so as to drive the hydraulic motor 24 in its other direction. In this manner, the brake valves are operated to their open position when the control valve is positioned to drive the hydraulic motor in either direction and, when the control valve is in its neutral position, the brake valves will maintain a preselected relatively high back pressure on the hydraulic motor to prevent rotation of the motor in either direction and thereby provide bi-directional braking action. During a turn, the pressure which builds up on the motor for the inside wheel is partially relieved by flow through one of the tubes 121 or 122 to aid in driving the outside motor. However, if one wheel loses traction and begins to spin, the tubes 120 and 121 restrict the flow therethrough so as to maintain pressure on the other motor to drive the other wheel.

We claim:

1. An hydraulic drive system for a vehicle having at least one drive wheel comprising, a pump, a fluid motor connected to said drive wheel, a flow reversing valve connected to said pump and having first and second flow passages connected to said motor, said reversing valve being operable to selectively supply fluid under pressure from said pump to said first and second flow passages, first and second brake valve means in said first and second flow passages for controlling flow therethrough, and means responsive to the application of fluid pressure from said pump to one of said flow passages for opening the brake valve means in both of said flow passages to drive said motor from said pump and responsive to termination of fluid pressure from the pump to both flow passages for closing said brake valve means to stop the motor.

2. An hydraulic drive system for a vehicle having at least one drive wheel comprising, a pump, a fluid motor connected to said drive wheel, a flow reversing valve connected to said pump and having first and second flow passages connected to said motor, said reversing valve being operable to selectively supply fluid under pressure to said first and second flow passages, first and second brake valve means in said first and second flow passages normally urged to a position blocking flow through said flow passages, a first means responsive to the application of a first preselected pressure from said pump to said one of said flow passages for opening said brake valve means to thereby effect driving of said motor from said pump, and a second means responsive to a second preselected pressure in said flow passages produced when said motor is driven by said drive wheel for opening said brake valve means to gradually stop said motor.

3. An hydraulic drive system for a vehicle having at least one drive wheel comprising, a pump, a fluid motor connected to said drive wheel, a flow reversing valve connected to said pump and having first and second flow passages connected to said motor to reversibly control the flow of fluid thereto, first and second brake valves in said first and second passages, said brake valves each including a first valve means operative to open to permit flow from the pump to the motor through the respective passage and to close to prevent return flow, said brake valves each including a second valve means connected in parallel to the respective first valve means and normally urged to a closed position, and means operative in response to the application of fluid under pressure from the pump to one of said passages for operating the second valve means in the other passage to its open position.

4. An hydraulic drive system for a vehicle having at least one drive wheel comprising, a pump, a fluid motor connected to said drive wheel, a flow reversing valve connected to said pump and having first and second flow passages connected to said motor for reversibly controlling the flow of fluid thereto, first and second brake valves in said first and second passages, said brake valves each including a first valve means operative to open to permit flow from the pump to the motor through the respective flow passage and to close to prevent return flow, said brake valves each including a second pressure operated valve means normally urged to a closed position, a first means operative in response to the application of a first preselected pressure from said pump to one of said flow passages for operating said second valve means in the other passage to its open position, and a second means operative in response to a second relatively high pressure in one flow passage produced when said motor is driven by the drive wheel for opening the second valve means in that flow passage to thereby gradually stop the motor.

5. An hydraulic drive system for a vehicle having at least one drive wheel comprising, a pump, a fluid motor connected to said drive wheel, a flow reversing valve connected to said pump and having first and second flow passages connected to said motor to reversibly control flow thereto, first and second braking devices in said first and second passages, said braking devices each including a check valve operative to open to permit flow from the pump to the motor and to close to prevent flow from the motor to the pump, said braking devices each including a by-pass valve connected across the respective check valve, means yieldably urging said by-pass valves to a closed position, fluid pressure responsive operating means on each by-pass valve, and means communicating with each flow passage between the reversing valve and the by-pass valve therein for applying fluid pressure to the operating means for the by-pass valve in the other flow passage to open the by-pass valve in one flow passage when fluid under pressure from the pump is supplied to the other flow passage.

6. An hydraulic drive system for a vehicle having at least one drive wheel comprising, a pump, a fluid motor connected to said drive wheel, a flow reversing valve connected to said pump and having first and second flow passages connected to said motor to reversibly control flow thereto, first and second braking devices in said first and second passages, said braking devices each including a check valve operative to open to permit flow from the pump to the motor and to close to prevent flow from the motor to the pump, said braking devices each including a by-pass valve connected across the respective check valve and having a valve member movable from a closed position to an open position, means yieldably urging the valve members to a closed position, means defining first and second areas on each of said valve members, means communicating with each flow passage at a point between the flow reversing valve and the by-pass valve therein for applying fluid pressure from the pump to said first area on the by-pass valve member in the other flow passage, and means communicating with each flow passage at a point between the by-pass valve thereon and the fluid motor for applying fluid pressure to said second area on the by-pass valve member in the respective flow passage.

7. An hydraulic drive system for a vehicle having at least one drive wheel comprising, a pump, a fluid motor connected to said drive wheel, a flow reversing valve connected to said pump and having first and second flow passages connected to said motor to reversibly control flow thereto, first and second braking devices in said first and second passages, said braking devices each including a check valve operative to open to permit flow from the pump to the motor and to close to prevent flow from the motor to the pump, said braking devices each including a by-pass valve connected across the respective check valve and having a valve member movable from a closed to an open position, means yieldably urging said valve member to its closed position, means defining first and second areas on each of said valve members, means operative when the reversing valve supplies fluid under pressure from the pump to one flow passage for applying fluid pressure to the first area on the by-pass valve member in the other flow passage to open the same, and means operative when the motor is driven by the wheel and pumps fluid into one flow passage for applying pressure to the second area on the by-pass valve member in that passage to open that by-pass valve and relieve the pressure in excess of a preselected valve to thereby gradually stop the motor.

8. The combination of claim 7 wherein said first area on each valve member is large as compared to said second area.

9. An hydraulic drive system for a vehicle having at least two drive wheels comprising pump means, a fluid motor connected to each said wheels, a pair of flow reversing valves connected to said pump means and each having supply and return conduits connected to a respective one of said fluid motors, said flow reversing valves being selectively operable to supply fluid under pressure from said pump means to said supply conduits to drive the wheels in one direction and to supply fluid to said return conduits to drive the vehicle in the other direction, conduit means communicating said supply conduits of said pair of flow reversing valves with each other, said conduit means defining a cross-flow passage having a flow impedance which is high as compared to the flow impedance of said supply conduits to restrict the rate of flow of fluid from one supply conduit to the other supply conduit.

10. An hydraulic drive system for a vehicle having a pair of drive wheels comprising, a fluid motor connected to each of said wheels, pump means, first and second flow control means connected to said pump means and each having supply and return conduits connected to a respective one of said fluid motors, said flow control means being selectively operable to supply fluid under pressure from said pump means to said supply conduits to drive said wheels in one direction and to supply fluid from said pump means to said return conduits to drive said vehicle in the other direction, and first and second cross-flow conduits respectively communicating the supply conduits of said first and second motors and the return conduits of said first and second motors with each other, said cross conduits having a flow impedance which is high as compared to the flow impedance of said supply and return conduits to restrict the rate of flow of fluid from the supply and return conduits of one motor to the supply and return conduits of the other motor.

11. An hydraulic drive system for a vehicle comprising at least two drive wheels located at opposite sides of the vehicle, a fluid motor connected to each wheel, pump means, first and second control valves connected to said pump means and each having supply and return conduits connected to a respective one of said fluid motors, said control valves being selectively operable to supply fluid from said pump means to said supply conduits to drive said motors in one direction, a first valve means in each conduit operative to open and permit flow from the pump to the motor and to close to prevent return flow, a second pressure operated valve means in each conduit connected across said first first valve means and normally urged to a closed position, means operative in response to the application of fluid pressure to one of said conduits for operating the second valve means in the other conduit to its open position, and first and second cross-flow conduits respectively communicating said supply conduits of said first and second motors and said return conduits of said first and second motors with each other.

12. The combination of claim 11 wherein said cross conduits have a flow impedance which is high as compared to the flow impedance of said supply and return conduits to restrict the rate of flow of fluid from the supply and return conduits of one motor to the supply and return conduits of the other motor.

13. The combination of claim 12 including means for operating said control valves in unison.

14. The combination of claim 11 wherein said first and second valve means in each conduit are located closely adjacent said motors.

15. The combination of claim 14 wherein said cross-flow conduits are located closely adjacent said control valves.

No references cited.